US007198065B2

(12) United States Patent
Vester

(10) Patent No.: US 7,198,065 B2
(45) Date of Patent: Apr. 3, 2007

(54) VALVE ARRANGEMENT

(75) Inventor: Jens Vester, Soenderborg (DK)

(73) Assignee: Sauer-Danfoss ApS, Nordborg (DE)

( * ) Notice: Subject to any disclaimer, the term of this patent is extended or adjusted under 35 U.S.C. 154(b) by 0 days.

(21) Appl. No.: 11/260,286

(22) Filed: Oct. 27, 2005

(65) Prior Publication Data

US 2006/0090802 A1 May 4, 2006

(30) Foreign Application Priority Data

Oct. 29, 2004 (DE) ...................... 10 2004 052 602

(51) Int. Cl.
*F16K 11/10* (2006.01)

(52) U.S. Cl. ....................................... 137/884; 137/554

(58) Field of Classification Search ................ 137/553, 137/554, 884

See application file for complete search history.

(56) References Cited

U.S. PATENT DOCUMENTS

| | | | | |
|---|---|---|---|---|
| 5,106,169 | A * | 4/1992 | Barefoot | 303/22.7 |
| 5,699,830 | A * | 12/1997 | Hayashi et al. | 137/554 |
| 5,819,783 | A * | 10/1998 | Blatt et al. | 137/271 |
| 5,950,661 | A * | 9/1999 | Kirchhoff-Stewens | 137/269 |
| 6,065,494 | A * | 5/2000 | Thomsen et al. | 137/552 |
| 6,169,338 | B1 | 1/2001 | Stoll et al. | 307/11 |
| 6,840,273 | B2 * | 1/2005 | Miyazoe et al. | 137/554 |

FOREIGN PATENT DOCUMENTS

| | | |
|---|---|---|
| DE | 197 46 179 A1 | 4/1999 |
| WO | WO 2004/055387 | 7/2004 |

* cited by examiner

*Primary Examiner*—John Fox
(74) *Attorney, Agent, or Firm*—McCormick, Paulding & Huber LLP

(57) ABSTRACT

The invention concerns a valve arrangement (1) with at least two valve modules (2, 4, 5), each having a valve element, whose position can be changed by means of an actuator (13, 13*a*, 13*b*), and to which a position sensor (19, 19*a*, 19*b*) is allocated, a line arrangement (24) being connected with the valve modules (2, 4, 5), through which control signals can be transmitted to the valve modules (2, 4, 5). It is endeavoured to increase the safety of such valve modules. For this purpose, at each valve module (2 to 5) the actuator (13) is provided with a control device (22, 22*a*, 22*b*), which is connected with the position sensor (19, 19*a*, 19*b*) and evaluates control signals for the valve module (2 to 5) concerned, that at least the control device (22*b*) of a first valve module (5) additionally evaluates the control signals for another, second valve module (4), and that this control device (22*b*) receives signals from the position sensor (19*a*) of the second valve module (4).

9 Claims, 2 Drawing Sheets

VALVE ARRANGEMENT

CROSS-REFERENCE TO RELATED APPLICATIONS

Applicant hereby claims foreign priority benefits under U.S.C. § 119 from German Patent Application No. 10 2004 052 602.8 filed on Oct. 29, 2004, the contents of which are incorporated by reference herein.

FIELD OF THE INVENTION

The invention concerns a valve arrangement with at least two valve modules, each having a valve element, whose position can be changed by means of an actuator, and to which a position sensor is allocated, a cable arrangement being connected with the valve modules, through which control signals can be transmitted to the valve modules.

BACKGROUND OF THE INVENTION

Such a valve arrangement is known from WO 2004/055387 A1.

Machines and devices performing hydraulic functions are usually connected with several consumers, each being controlled via a control valve. For example, a backhoe has several hydraulic cylinders, each lifting a different section of a boom, a rotary motor, with which the uppercarriage can be turned in relation to the undercarriage, and if required a further hydraulic function for activating a grab or a chisel located at the end of the boom. Similar conditions exist in other devices with hydraulic functions, for example, working platforms, tractors or agricultural machines, etc.

In this connection, each individual control valve is located in a valve module. The valve modules are combined to a block or a battery-like unit. This block is supplied with pressurised hydraulic fluid via a high-pressure connection. Depending on the position of the valve elements of each individual control valve, the hydraulic fluid from the high-pressure connection is then passed on to an outlet with a more or less large volume flow or with a more or less high pressure. For example, the control valves can be proportional valves, which permit a predetermined volume flow of hydraulic fluid to the working connection and thus to a consumer, depending on the position of a valve element.

Working devices and machines, which perform hydraulic functions, involve potential risks. Accordingly, a relatively high safety standard is required. Above all, it is desired to avoid that people get hurt, when faults occur.

Faults could, for example, occur in that the valve element is not displaced in the manner specified by the control signals. This can, of course, be controlled directly by means of the position sensor. However, under certain circumstances, this control can also be faulty.

BRIEF SUMMARY OF THE INVENTION

The invention is based on the task of providing a valve arrangement with a high security level.

With a valve arrangement as mentioned in the introduction, this task is solved in that at each valve module the actuator is provided with a control device, which is connected with the position sensor and evaluates control signals for the valve module concerned, that at least the control device of a first valve module additionally evaluates the control signals for another, second valve module, and that this control device receives signals from the position sensor of the second valve module.

With this embodiment, each valve module has, in a manner of speaking, its own "intelligence", that is, the control device can activate the actuator in such a manner that the valve element is displaced to a desired position. By means of the position sensor of this valve module this position can be determined. Thus, a control possibility is already available in a valve module, with which it can be controlled in a first safety step, if the valve element has reached the desired position. However, as described above, it is possible in theory that also this control is faulty. Therefore, an additional control possibility is added, in which a further valve module is involved. In order to be able to distinguish between these two valve modules, they are called "first valve module" and "second valve module". When a control of the position of the valve element in the second valve module is required, the corresponding control signals are also transmitted to the first valve module. Thus, the first valve module "knows" where the valve element of the second valve module should be. Further, the first valve module also receives the signals of the position sensor of the second valve module, so that the first valve module can separately control, if the valve element is in the correct position. Only when these two pairs of information correspond to each other, it is assumed that the second valve module works without faults.

Preferably, an own line is provided between the control device of the first valve module and the position sensor of the second valve module. Thus, this line merely transmits the signals of the position sensors, not, however, additional data, like position signals etc. Therefore, it can be assumed with a high degree of reliability that the signals, which arrive via this hardware-line, are undisturbed.

Preferably, the line is an analog line. Thus, this line transmits an analog signal of the position sensor. In this manner it can also be ensured that faults will be recognised when the analog position sensor information is converted to a digital signal.

It is also advantageous that the first valve module and the second valve module are located next to each other. When, for example, the two valve modules are combined to a valve block, they bear on each other.

This keeps the lines, for example the line from the position sensor to the control device, short. The possibility that faults occur here is small.

Preferably, the valve modules are arranged in an annular structure with a view to the connection between the control device of the first valve module and the position sensor of the second valve module. Thus, the first valve module receives signals from the position sensor of the second valve module. The second valve module receives signals from the position sensor of the third valve module etc. The last valve module receives signals from the position sensor of the first valve module. Thus it is possible to ensure the monitoring of all valve modules in a simple manner.

Preferably, the control device of the first valve module evaluates the signal of the position sensor of the first valve module in the same manner as the signal of the position sensor of the second valve module. Firstly, this saves certain efforts during manufacturing and testing of the valve arrangement. It is not required to develop and test two routines, merely one. Further, it is ensured that the test itself cannot give rise to an additional fault.

Preferably, the control device of the second valve module evaluates the position of the valve element of the second valve module on the basis of the signals of the position sensor of the second valve module and reports them to the control device of the first valve module. Thus, the control device of the first valve module receives three signals, namely the steering signal, that is, the desired value, and two actual values. Only when these three values correspond to each other, a faultless state is assumed.

Preferably, the line arrangement has the form of a bus, particularly a CAN-bus. With a bus line a plurality of valve modules can be reached without requiring additional wiring costs.

Preferably, a shut-off valve is provided additionally to the valve modules. With such a shut-off valve the complete valve arrangement can be switched to a safe state, so that no uncontrolled functions or movements can occur in the case of faults.

BRIEF DESCRIPTION OF THE DRAWINGS

In the following, the invention is described on the basis of a preferred embodiment in connection with the drawings, showing.

DETAILED DESCRIPTION OF THE INVENTION

Figure 1:
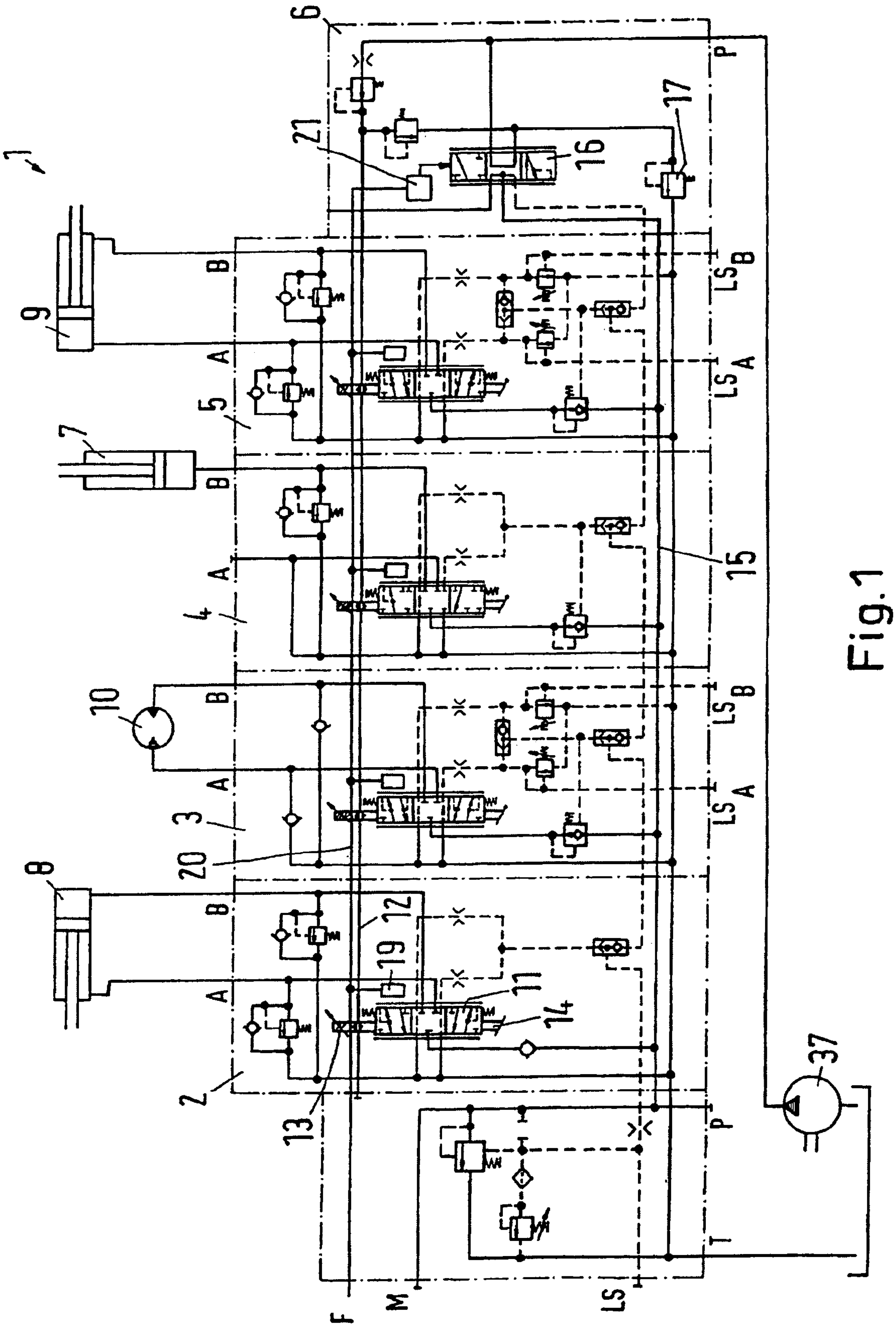
FIG. 1 is a schematic view of a valve arrangement.

A valve arrangement 1 has a high-pressure connection P, a low-pressure connection T, several control valve modules 2 to 5 and a safety valve 6. Each valve module 2 to 5 has two working connections A, B, to which hydraulic consumers are connected. The hydraulic consumers can have different embodiments. They can, for example, be single-acting cylinders 7, double-acting cylinders 8, or a rotary motor 10. Of course, also more than the four valve modules 2 to 5 shown can be provided. The number of valve modules 2 to 5 corresponds to the number of desired hydraulic functions. In the present case, all valve modules 2 to 5 are proportional valves, that is, they have a control slide as valve element 11, which is supplied with a pilot pressure via a pilot pressure pipe 12. The pilot pressure of the pilot pressure pipe 12 is then led via a solenoid valve arrangement 13 to the valve element 11 in such a manner that the valve element is displaced in one direction or the other. In many cases, the valve element 11 is a valve slide.

The valve element 11 can also be displaced by a mechanical handle, for example a lever.

The valve modules 2 to 5 are not directly connected with the pressure connection P, but with an auxiliary pressure pipe 15, which is led through the valve arrangement 1. The auxiliary pressure pipe 15 is separated from the high-pressure connection P by the safety valve 6. This safety valve 6 has a valve element 16, which, in the neutral position shown, connects high-pressure connection P with the low-pressure connection T, a pressure control valve 17 being located in this connection. Thus, in the neutral position shown, a connection from the high-pressure connection P to the valve modules 2 to 5 is completely interrupted, that is, no pressurised hydraulic fluid reaches the valve modules 2 to 5. Thus, the consumers 7 to 10 can no longer be activated. Under certain circumstances, they can be brought to a safer position, when the valve elements 11 of the valve modules 2 to 5 are activated accordingly. However, it is not possible to provide the consumers 7 to 10 with pressurised hydraulic fluid.

Figure 2:
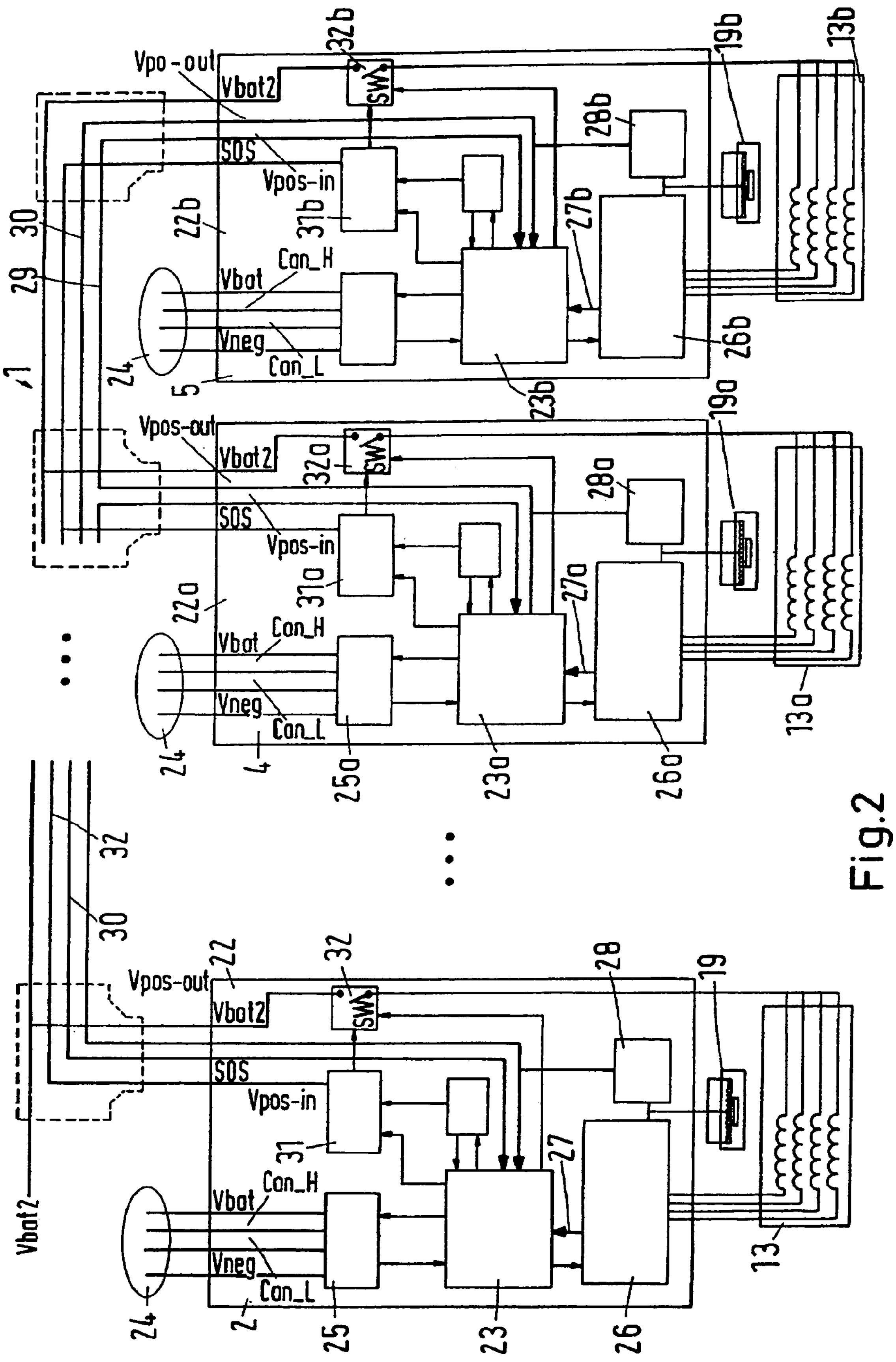
FIG. 2 is a corresponding safety concept.

Thus, it must be possible to activate the safety valve 6, when somewhere in the valve arrangement 1 a fault occurs. In order to determine the nature of such a fault, firstly each valve module 2 to 5 is provided with a position sensor 19 for the valve element 11. This position sensor 19, for example, has the form of an LVDT-transducer, as used in a valve unit PVG 32 of Sauer-Danfoss ApS, Nordborg, Denmark. The integration of this position sensor 19 in the safety concept will now be explained by means of FIG. 2. Here, the solenoid valve arrangement 13 is merely shown schematically.

The solenoid valve arrangement 13, which forms an actuator, is controlled via a control device 22. The control device 22 comprises a microprocessor 23, which is connected with a bus 24, for example a CAN-bus, via an interface 25. Via the bus 24, each valve module 2 to 5 receives control signals, which indicate the position of the valve element 11, and which are to be set by the microprocessor 23. The microprocessor 23 is connected with the solenoid valve arrangement 13 via a driver 26, which can be an ASIC. Via a feedback 27, the driver 26 reports back its result to the microprocessor 23, so that the microprocessor 23 can perform some sort of monitoring.

Also the position sensor 19 is connected with the driver 26. Further, the position sensor 19 is connected with the microprocessor 23 via a filter 28. The microprocessor 23 evaluates the analog, filtered signal of the position sensor 19 to determine the position of the valve element 11. Thus, the result is a monitoring, which can, under certain circumstances, also be used for a control. With this embodiment, it is also possible to realise a redundant signal treatment on module level.

The other valve modules 4, 5 have similar elements, "a" or "b", respectively, being added to their reference numbers.

As an additional safety measure, it has now been provided that the outlet of the filter 28*a* is not only connected with the microprocessor 23*a* of the related valve module 4, but also with the microprocessor 23*b* of the neighbouring valve module 5. For this purpose, a separate line 29 is provided in the form of an analog line, that is, the output signal of the filter 28*a* is transmitted as an analog signal to the microprocessor 23*b* of the neighbouring valve module 5. The microprocessor 23*b* now evaluates this output signal of the filter 28*a*, that is, the signal of the position sensor 19*a*, in exactly the same manner as the signal of the own position sensor 19*b*. This is possible, as the microprocessor 23*b* has also received the information about the desired position of the valve element of the valve module 4 via the bus 24.

Via a line 30, the signal of the position sensor 19*b* of the last valve module 5 is transmitted back to the first valve module 2, so that in a manner of speaking the valve modules 2 to 5 are arranged in a ring.

When the microprocessor 23, 23*a*, 23*b* determines that the position of the valve element 11 does not correspond to the set-point value, it can generate a signal on an SOS-line 32 via an alarm unit 31, 31*a*, 31*b*, which then activates a valve actuator 21 for the safety valve 6, to displace this safety valve to the so-called safe state.

The alarm unit 31 can also activate a local emergency switch 32, 32*a*, 32*b* to interrupt the power supply in a line 33.

While the present invention has been illustrated and described with respect to a particular embodiment thereof, it should be appreciated by those of ordinary skill in the art that various modifications to this invention may be made without departing from the spirit and scope of the present invention.

What is claimed is:

1. A valve arrangement with at least two valve modules, each having a valve element, whose position can be changed by means of an actuator, and to which a position sensor is allocated, a line arrangement being connected with the valve modules, through which control signals can be transmitted to the valve modules, wherein at each valve module the actuator is provided with a control device, which is connected with the position sensor and evaluates control signals for the valve module concerned, that at least the control device of a first valve module additionally evaluates the control signals for another, second valve module, and that this control device receives signals from the position sensor of the second valve module.

2. The valve arrangement according to claim 1, wherein an own line is provided between the control device of the first valve module and the position sensor of the second valve module.

3. The valve arrangement according to claim 2, wherein the line is an analog line.

4. The valve arrangement according to claim 1, wherein the first valve module and the second valve module are located next to each other.

5. The valve arrangement according to claim 1, wherein the valve modules are arranged in an annular structure with a view to the connection between the control device of the first valve module and the position sensor of the second valve module.

6. The valve arrangement according to claim 1, wherein the control device of the first valve module evaluates the signal of the position sensor of the first valve module in the same manner as the signal of the position sensor of the second valve module.

7. The valve arrangement according to claim 1, wherein the control device of the second valve module evaluates the position of the valve element of the second valve module on the basis of the signals of the position sensor of the second valve module and reports them to the control device of the first valve module.

8. The valve arrangement according to claim 1, wherein the line arrangement has the form of a bus, particularly a CAN-bus.

9. The valve arrangement according to claim 1, wherein a shut-off valve is provided additionally to the valve modules.

* * * * *

UNITED STATES PATENT AND TRADEMARK OFFICE

CERTIFICATE OF CORRECTION

PATENT NO. : 7,198,065 B2
APPLICATION NO. : 11/260286
DATED : April 3, 2007
INVENTOR(S) : Jens Vester It is certified that error appears in the above-identified patent and that said Letters Patent is hereby corrected as shown below:

TITLE PAGE, ITEM (73) ASSIGNEE: please delete the letters "(DE)" and replace with --(DK)--.

Signed and Sealed this

Twelfth Day of June, 2007

JON W. DUDAS
*Director of the United States Patent and Trademark Office*